United States Patent
Harrington et al.

(10) Patent No.: US 9,824,115 B2
(45) Date of Patent: Nov. 21, 2017

(54) EFFICIENT LOG INFORMATION MANAGEMENT AND ANALYSIS

(71) Applicant: International Business Machines Corporation, Armonk, NY (US)

(72) Inventors: Shaun E. Harrington, Sahuarita, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 14/158,805

(22) Filed: Jan. 18, 2014

(65) Prior Publication Data

US 2015/0205854 A1    Jul. 23, 2015

(51) Int. Cl.
*G06F 7/00* (2006.01)
*G06F 17/00* (2006.01)
*G06F 17/30* (2006.01)
*G06F 13/14* (2006.01)

(52) U.S. Cl.
CPC .............................. *G06F 17/30368* (2013.01)

(58) Field of Classification Search
CPC ......... G06F 17/30598; G06F 17/30705; G06F 17/30867; G06F 17/30958; G06F 17/30699; G06F 17/30707; G06F 17/3089; G06F 17/30923; G06F 17/30156; G06F 17/30368; G06F 17/30716; G06F 17/30994
USPC ............... 707/722, 740, 723, 708, 737, 769, 707/E17.008; 705/26.1, 14.54, 14.71, 705/14.73, 36 R; 706/55, 45
See application file for complete search history.

(56) References Cited

U.S. PATENT DOCUMENTS

| | | | |
|---|---|---|---|
| 6,684,218 B1 * | 1/2004 | Santos | G06F 17/30864 |
| 6,907,546 B1 * | 6/2005 | Haswell | G06F 11/3684 |
| | | | 714/38.11 |
| 8,234,256 B2 | 7/2012 | DeStefano et al. | |
| 8,266,159 B2 | 9/2012 | Torres | |
| 2007/0094221 A1 * | 4/2007 | Au | G06F 17/2785 |
| | | | 706/55 |
| 2007/0300179 A1 * | 12/2007 | Friedlander | G06F 9/45512 |
| | | | 715/781 |
| 2009/0030862 A1 * | 1/2009 | King | G06F 17/30705 |
| | | | 706/45 |

(Continued)

*Primary Examiner* — Heather Herndon
*Assistant Examiner* — Cecile Vo
(74) *Attorney, Agent, or Firm* — Nelson and Nelson; Daniel P. Nelson; Alexis V. Nelson (57) ABSTRACT

A method for efficiently managing and analyzing log information is disclosed. In one embodiment, such a method includes providing a community database for a particular product and enabling a user to view a log file associated with the particular product. The method further enables the user to create a category and link a portion of a line of the log file to the category. The category is then submitted to a database administrator to accept or decline the category for admission into the community database. In the event the database administrator accepts the category into the community database, the category is stored in the community database and the portion of the line is linked to the category. Upon opening and viewing future log files, the category may then be used to label lines containing the portion. A corresponding apparatus and computer program product are also disclosed.

20 Claims, 6 Drawing Sheets

(56) References Cited

U.S. PATENT DOCUMENTS

| | | | | |
|---|---|---|---|---|
| 2009/0144699 A1* | 6/2009 | Fendt | ................... | G06F 11/004 717/120 |
| 2011/0161182 A1* | 6/2011 | Racco | ................ | G06Q 30/0277 705/14.73 |
| 2014/0046980 A1* | 2/2014 | Kleinschmidt | ... | G06F 17/30896 707/793 |

\* cited by examiner

EFFICIENT LOG INFORMATION MANAGEMENT AND ANALYSIS

BACKGROUND

Field of the Invention

This invention relates to apparatus and methods for efficiently managing and analyzing log information.

Background of the Invention

Many systems produce logs to record events taking place during their execution. Such logs provide an audit trail that can be used to understand the activity of the systems and/or to diagnose problems. Nevertheless, such logs often use terminology, codes, and/or messages that are esoteric and difficult to understand, particularly for the untrained user. Such logs may also be very extensive and therefore difficult to manage and search to find desired information.

Currently, there is no universal method or technique to view and manage logs. The methods and techniques that do exist are typically very limited and product-specific. For example, existing methods and techniques may include using the built-in Linux® file editor or Windows® Notepad to view and manage log information. There are also a large number of third party tools and applications available on the Internet to view and manage log information. However, the ability to quickly parse through, sort, and/or seek out specific information in logs using existing tools is extremely limited.

Due to the lack of available tools, some teams of programmers/developers have developed basic search and reference functions that pull from a database of known issues and errors. These functions may sort through log files to find common strings that may then be identified as known issues to a customer or technician. A number of problems arise from these functions due to the lack of uniformity in their design and the necessary tailoring per product per log file. For example, in order for log file X to be referenced and sorted, database X must already exist and be kept up-to-date. If another log file Y comes along after log file X, a new database Y must be created to enable referencing and sorting of log file Y. The same issue occurs when changing from one product (e.g., application or device) to another. Short of multiple developers producing multiple databases and maintaining these databases whenever log file changes occur, there is very little chance for a uniform solution using these existing techniques.

In view of the foregoing, what are needed are apparatus and methods to more efficiently manage and analyze log information. Ideally, such apparatus and methods will provide a uniform solution for multiple log files and/or products. Such apparatus and methods will also ideally be continually improved by frequent usage and require little developer attention after initial creation.

SUMMARY

The invention has been developed in response to the present state of the art and, in particular, in response to the problems and needs in the art that have not yet been fully solved by currently available apparatus and methods. Accordingly, apparatus and methods have been developed to more efficiently manage and analyze log information. The features and advantages of the invention will become more fully apparent from the following description and appended claims, or may be learned by practice of the invention as set forth hereinafter.

Consistent with the foregoing, a method for efficiently managing and analyzing log information is disclosed herein. In one embodiment, such a method includes providing a community database for a particular product and enabling a user to view a log file associated with the particular product. The method further enables the user to create a category and link a portion (words, phrases, terms, etc.) of a line of the log file to the category. The category is then submitted to a database administrator to accept or decline the category for admission into the community database. In the event the database administrator accepts the category into the community database, the category is stored in the community database and the portion of the line is linked to the category. Upon opening and viewing future log files, the category may then be used to label lines containing the portion by comparing the future log files with categories in the community database.

A corresponding apparatus and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, conventional procedural programming languages such as the "C" programming language, scripting languages such as JavaScript, or similar programming languages. Computer program code for implementing the invention may also be written in a low-level programming language such as assembly language.

Embodiments of the invention may be described below with reference to flowchart illustrations and/or block diagrams of methods, apparatus, systems, and computer program products. It will be understood that each block of the flowchart illustrations and/or block diagrams, and combinations of blocks in the flowchart illustrations and/or block diagrams, may be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
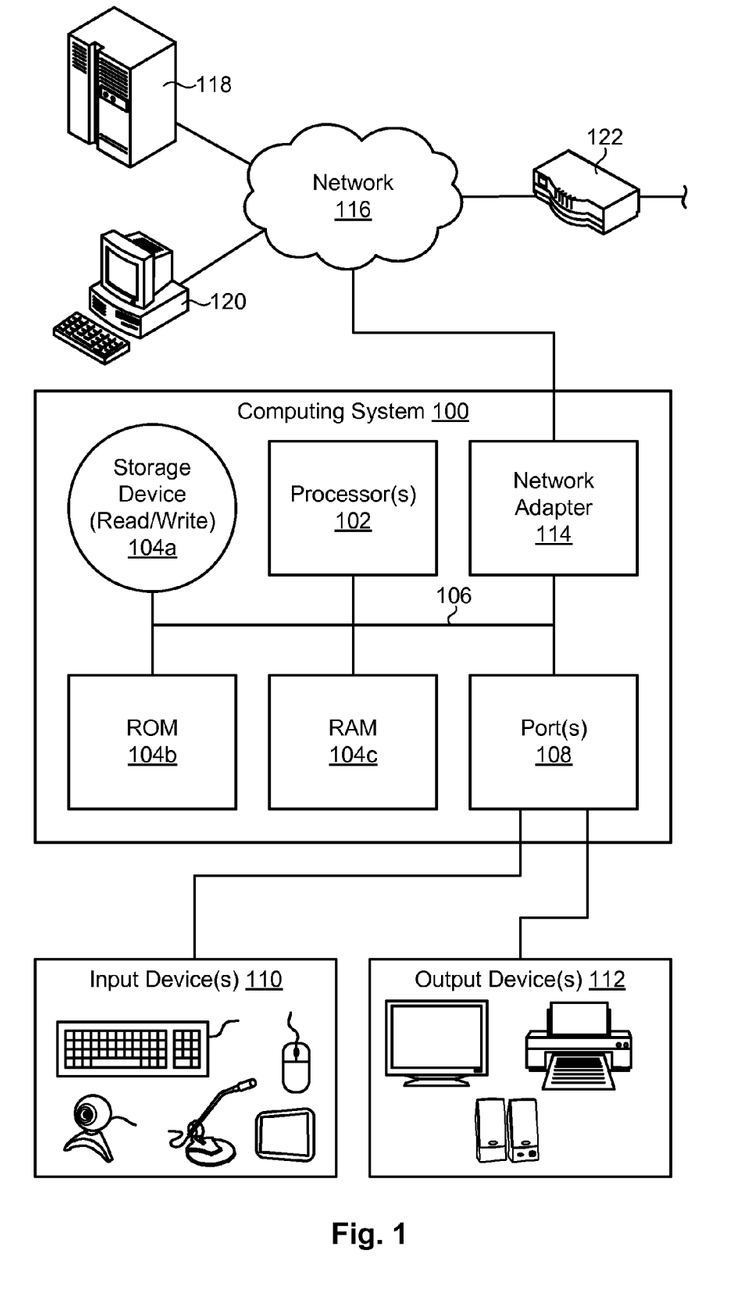
FIG. 1 is a high-level block diagram showing one example of a computing system in which various components of an apparatus and method in accordance with the invention may be implemented.

Referring to FIG. 1, one example of a computing system 100 is illustrated. The computing system 100 is presented to show one example of an environment where various components of an apparatus and method in accordance with the invention may be implemented. The computing system 100 is presented only by way of example and is not intended to be limiting. Indeed, the apparatus and methods disclosed herein may be applicable to a wide variety of different computing systems in addition to the computing system 100 shown. The apparatus and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a network adapter 114 to connect the computing system 100 to a network 116, such as a LAN, WAN, or the Internet. Such a network 116 may enable the computing system 100 to connect to one or more servers 118, workstations 120, personal computers 120, mobile computing devices, or other devices. The network 116 may also enable the computing system 100 to connect to another network by way of a router 122 or other device 122. Such a router 122 may allow the computing system 100 to communicate with servers, workstations, personal computers, or other devices located on different networks.

Figure 2:
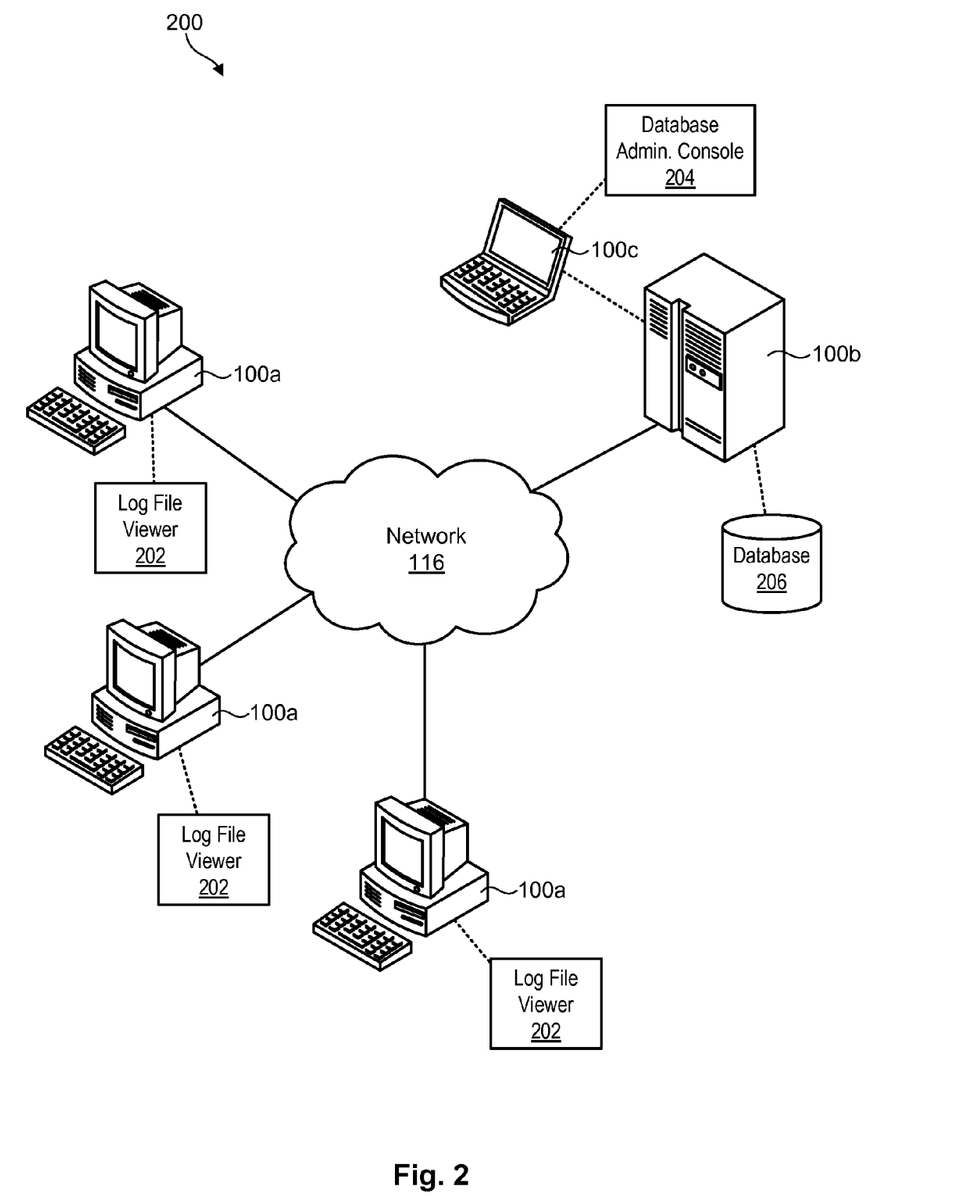
FIG. 2 is a block diagram showing a high-level view of a log management system in accordance with the invention.

Referring to FIG. 2, a high-level view of one embodiment of a log management system 200 in accordance with the invention is illustrated. As shown, in certain embodiments, a log management system 200 may include a plurality of computing systems 100a, 100b, 100c to perform different functions. Some computing systems 100a may host log file viewers 202 which act as graphical user interfaces (or GUIs) to enable users to view and filter log files, while other computing systems 100b, 100c may host one or more community databases 206 or function as a database administrator console 204.

The log file viewers 202 may enable users to view entire log files or, by selecting desired filters (i.e., categories stored in a community database 206), only view lines or portions of log files that deal with a particular issue or issues. This will enable a user to more easily locate specific issues or problems in log files, since extraneous information will be filtered out or hidden from view. As will be explained in more detail hereafter, the log file viewers 202 may also enable users to flag particular lines or portions (e.g., words, phrases, elements) of lines in log files and assign these lines or portions of lines to particular categories in the community database 206. For example, if a user examines the first four lines of a log and notices that lines three and four are related to Fiber Channel traffic logging, the user could select lines three and four and flag them with a desired category, such as a "Fiber" category. This ability may be available to some or all users of a log file viewer 202. If a desired category does not exist, the log file viewer 202 may also enable users to create new categories in the community database 206 and, assuming the categories are approved by a database administrator, assign lines or portions of lines to these newly created categories.

As alluded to above, a community database 206 may store categories for a particular hardware or software product that produces log files. Once the database 206 is created, a community of users may update and maintain categories in the database 206 without further developer involvement. This may provide a user-created knowledge base that is continually improved as it is used. Thus, in certain embodiments, after initial development, the log management system 200 may evolve and improve from usage as opposed to from further developer involvement. A database administrator, working through a database administrator console 204, may administer the database 206 and ensure that duplicate, redundant, incorrect, and/or unnecessary categories are avoided in the database 206. The database administrator may have the authority to accept or decline a category for admission into the community database 206.

In certain embodiments, a separate database 206 may be created for each different product that produces log files viewable in the log file viewers 202. In other embodiments, a database 206 may be created and shared by multiple products, such as in cases where multiple products share common issues or have similar log entries. In yet other embodiments, a single database 206 may be provided for issues common to multiple products, whereas individual databases 206 may be provided for issues that are more product-specific. Other variations for storing database categories are possible and within the scope of the invention.

Figure 3:
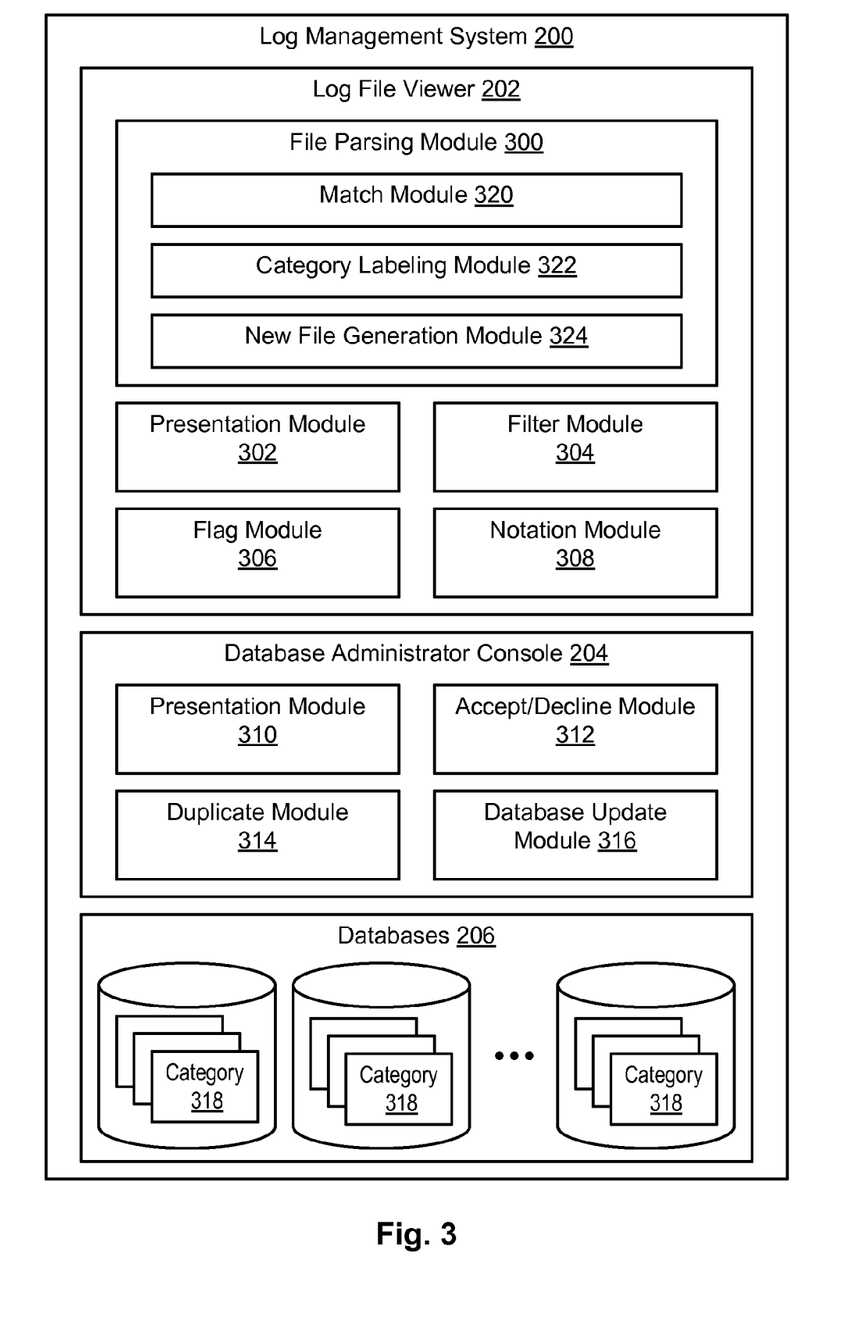
FIG. 3 is a high-level block diagram showing various internal modules or components that may be included in a log management system in accordance with the invention.

Referring to FIG. 3, one embodiment of a log management system 200 for efficiently managing and analyzing log information is illustrated. As shown, the log management system 200 includes one or more modules that provide various features and functions. These modules may be implemented in hardware, software or firmware executable on hardware, or a combination thereof. These modules are presented only by way of example and are not intended to be limiting. Indeed, alternative embodiments may include additional or fewer modules than those illustrated, or the modules may be organized differently. Furthermore, it should be recognized that, in some embodiments, the functionality of some modules may be broken into multiple modules or, conversely, the functionality of several modules may be combined into a single or fewer modules.

As shown, the log management system 200 includes a log file viewer 202, a database administrator console 204, and one or more databases 206. As previously mentioned the log file viewer 202 may enable users to view entire log files or, by selecting desired filters, view lines or portions of log files that deal with a particular issue or issues. The database administrator console 204 may be used by a database administrator to administer the database 206 and accept or decline categories for admission into the databases 206. One or more databases 206 may store categories for classifying or categorizing lines or portions (e.g., terms, phrases, words, etc.) of lines found in log files.

As shown, in certain embodiments, the log file viewer 202 may include one or more of a file parsing module 300, a presentation module 302, a filter module 304, a flag module 306, and a notation module 308. The file parsing module may include one or more of a match module 320, a category labeling module 322, and a new file generation module 324.

When a log file is opened for a particular product (such as by using an "open file" option in the log file viewer 202, navigating to a specific location in a file system, and selecting a log file to be opened), a match module 320 within the file parsing module 300 may look for matches between lines or portions of lines in the log file with terms or phrases that are associated with particular categories in the product database 206. When a match is found, the category labeling module 322 may label the line with the corresponding category. In certain embodiments, each category may have a code (e.g., a four digit code) associated therewith and the category labeling module 322 may label the line with the corresponding code, such as at the beginning or end of the line. This may enable a user to see the category associated with or assigned to each line when viewing a log file. If a line is not associated with any category, the category labeling module 322 may simply label the line with "none" or some other suitable label, or may simply opt not to label the line at all. Once all lines have been processed, or as lines are being processed, a new file generation module 324 may generate a new log file (e.g., a log file having the original log file name with ".new" at the end) that contains the newly labeled lines.

In certain embodiments, the file parsing module 300 may be configured to parse each line of the log file, line by line, to reduce memory usage. That is, the file parsing module 300 may read a first line of the log file, look for matches for the line in the database 206, label the line with an appropriate category if any is found, and write the line to a new log file before loading the next line of the log file into memory and analyzing it. Because only a single line is being processed at any given time, memory usage may be reduced or minimized.

Once all lines are parsed and labeled with an appropriate category, a presentation module 302 may open and present the new log file to a user. Using this new log file, a filter module 304 may enable the user to apply selected filters to the lines of the log file. For example, the filter module 304 may enable the user to select a category or categories and display only lines that correspond to the selected category or categories. Similarly, if a user believes that all or a portion of a line should be assigned to a particular category, a flag module 306 may enable the user to flag the line or portion of the line with a category. If a desired category does not exist and the user believes a new category should be created, the flag module 306 may also enable the user to request that a new category be created and assigned to a line or portion of the line. This request may be sent to an intermediate database where it may wait for approval. A database administrator may then approve or deny the creation of the new category and the assignment of the line or portion of the line thereto, as will be explained in more detail hereafter.

Further tailoring of categories may also occur to provide more detail than simply a category name and filtration, such as if a known error message occurs in a log file that is perhaps solved or addressed by a published technote. In such cases, a notation module 308 may enable a user to flag and attach specific notes to lines or portions of lines in a log file. These notations may then be available to identify the same or similar lines or portions of lines in other log files opened and viewed in the future.

As previously mentioned, in certain embodiments, a database administrator may be used to administer the database 206 and ensure that duplicate, redundant, incorrect, and/or unnecessary categories are avoided in the database 206. To facilitate database administration, the log management system 200 may include a database administrator console 204. In certain embodiments, this database administrator console 204 may include one or more of a presentation module 310, an accept/decline module 312, a duplicate module 314, and a database update module 316.

The presentation module 310 may present recently generated flag requests to the database administrator. Such flag requests may include, for example, adding a new category to the database 206, deleting an existing category from the database 206, modifying an existing category in the database 206, assigning one or more lines or portions (i.e., words, phrases, etc.) of lines to categories in the database 206, removing one or more lines or portions of lines from categories in the database 206, or the like. An accept/decline module 312 may enable the database administrator to accept or decline the flag requests, such as with a simple "Yes" or "No".

In certain embodiments, a duplicate module 314 may be provided to look for duplicate, similar, or overlapping categories in the database 206. Based on information provided by the duplicate module 314, a database administrator may decide to accept or decline a particular flag request to modify the database 206. In the event the database administrator accepts a flag request, a database update module may update the database 206, such as by adding a new category to the database 206, deleting an existing category from the database 206, modifying an existing category in the database 206, or the like.

As previously mentioned, the log management system 200 may include one or more databases 206 storing categories 318 that are used to label and filter lines in log files. In certain embodiments, each category 318 includes a name and a list of words or phrases that are associated with the category 318. When a word or phrase associated with a category 318 is discovered in a log file during the parsing phase, the line may be labeled with the category name to indicate its association with the category 318. As previously mentioned, the log management system 200 may use a separate database 206 for each different product producing a log file, a common database 206 for multiple products, or a combination thereof.

Figure 4:
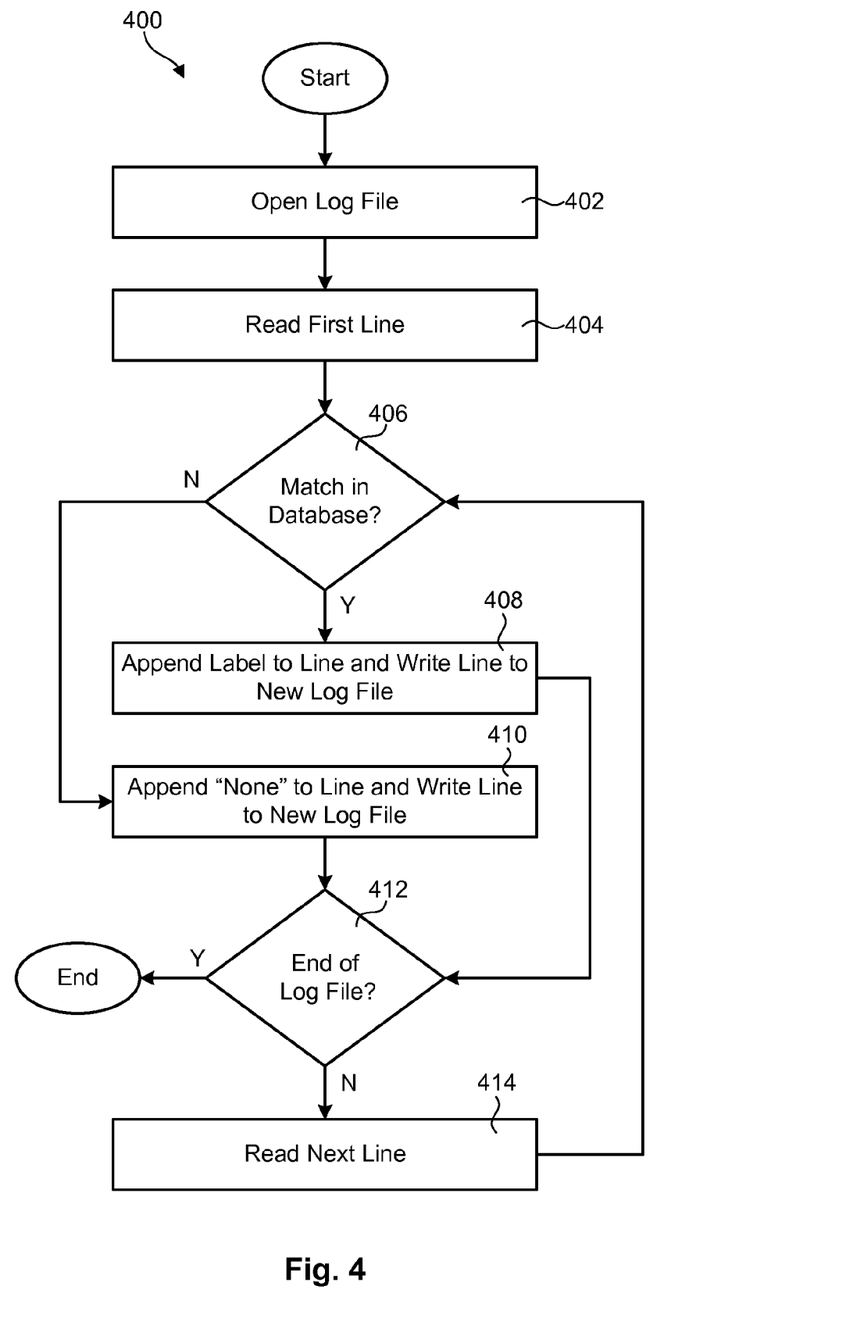
FIG. 4 is a process flow diagram showing one embodiment of a method for opening and parsing a log file to create a new log file.

Referring to FIG. 4, one embodiment of a method 400 for opening and parsing a log file to create a new log file is illustrated. Such a method 400 may be performed by the file parsing module 300 discussed in association in FIG. 3. As shown, the method 400 may open 402 a log file that a user wishes to view and read 404 the first line of the log file. The method 400 may then look 406 for matches in the database 206. Looking 406 for matches may include looking for categories in the database 206 having words or phrases that match words or phrases in the first line. If a match is found, the method 400 may append 408 a label to the line indicating the category or categories associated with the line, and write 408 the line to a new log file. If a match is not found, the method 400 may simply append 410 a default label of "none" to the line and write 410 the line to the new log file. The method 400 may then determine 412 whether the end of the log file has been reached. If the end has not been reached, the method 400 reads 414 the next line and performs the steps 406, 408, 410 discussed above. These steps are performed for each line in the log file until all lines have been written to the new log file.

Figure 5:
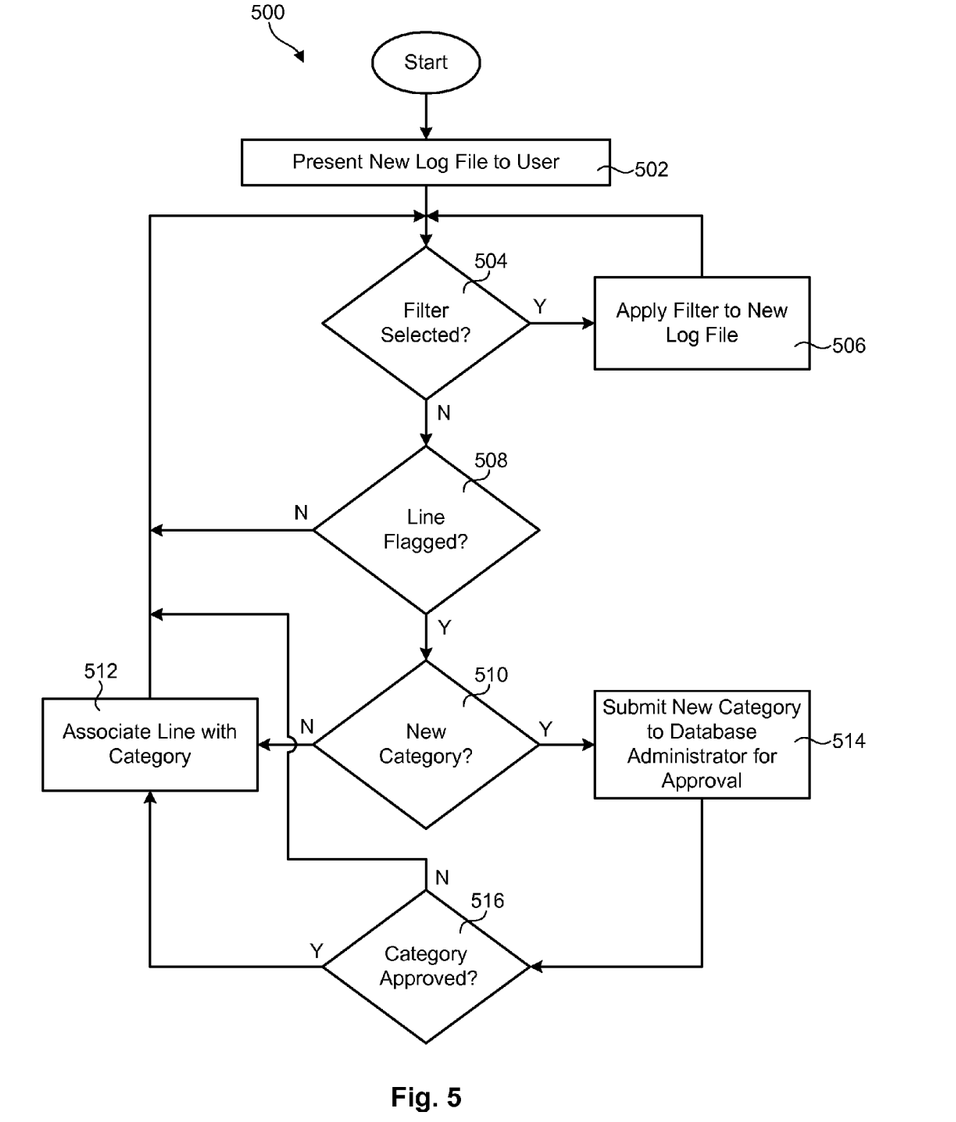
FIG. 5 is a process flow diagram showing one embodiment of a method for filtering and flagging lines in a new log file.

Referring to FIG. 5, one embodiment of a method 500 for filtering and flagging lines in a new log file is illustrated. Such a method 500 may be performed by the log file viewer 202 previously described. As shown, the method 500 initially presents 502 a new log file to a user. The method 500 then determines 504 if one or more filters (e.g., categories) have been selected. If a filter has been selected, the method 500 applies 506 the filter to the new log file. This may include only displaying lines associated with the selected filter, while hiding or removing lines not associated with the selected filter.

The method 500 may further determine 508 whether one or more lines or portions of lines have been flagged 508 by a user. If one or more lines or portions of lines have been flagged 508, the method may determine 510 whether the lines or portions of lines have been flagged with a new or existing category. If the lines or portions of lines have been flagged with an existing category, the method 500 may simply associate 512 the lines or portions of lines with the existing category. Alternatively, the method 500 may send a request to a database administrator to approve/deny the association of the lines or portions of lines with the existing category.

If, at step 510, the category used to flag the lines or portions of lines is a new category, the method 500 may submit 514 the new category to the database administrator for approval/denial. If, at step 516, the category is approved 516, the method 500 may associate 512 the lines or portions of lines with the new category. If the category is denied, the method may decline to generate the new category or associate the lines or portions of lines with the new category.

Figure 6:
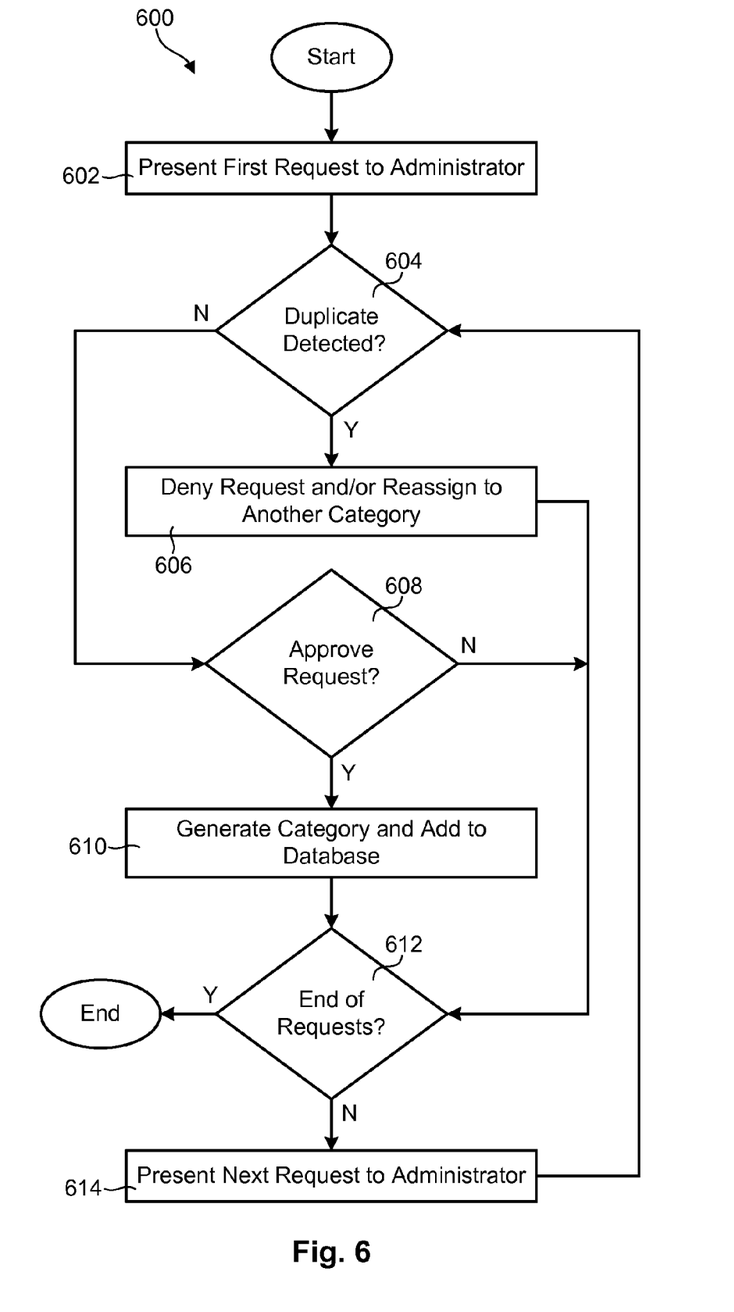
FIG. 6 is a process flow diagram showing one embodiment of a method for screening categories for admission into a community database.

Referring to FIG. 6, one embodiment of a method 600 for screening categories 318 for admission into the community database 206 is illustrated. Such a method 600 may be performed by the database administrator console 204 discussed in association with FIG. 3. As previously discussed, the database administrator console 204 may present flag requests to a database administrator to change the community database 206 in some way. The database administrator may then accept or decline the flag requests.

As shown, the method 600 initially presents 602 a first flag request to a database administrator. Assuming that the flag request is to create a new category in the community database 206, the method 600 determines 604 whether a duplicate is detected in the community database 206. Detecting a duplicate 604 may include detecting an exact category match in the community database 206 or detecting a similar category that basically serves the same function. In other cases, detecting a duplicate 604 may include detecting one or more overlapping categories 318 that encompass the requested category 318 and serve the same purpose. If a duplicate is detected or if the requested category would be incorrect and/or unnecessary, the database administrator may deny 606 the flag request. Optionally, the database administrator may reassign 606 the flag request to another category 318. For example, if a user is attempting to assign certain lines or portions of lines to a new category and the new category is found to have a duplicate in the community database 206, the database administrator may reject the new category and instead assign the lines or portions of lines to an existing category that is deemed equivalent.

If, at step 604, a duplicate is not discovered, the method 600 may move to decision step 608 to either approve or deny the flag request. If the flag request is approved, the method 600 generates 610 the category (assuming the flag request is to add a new category to the database 206) and adds 610 the category to the community database 206. If the flag request is denied, the community database 206 is not changed. The method 600 then determines 612 whether the flag request processed in the last flag request. If the flag request is not the last flag request, the method 600 presents 614 the next flag request to the database administrator and the method 600 repeats the steps 604, 606, 608, 610 for the next flag request. This process continues for all flag requests until the method 600 ends.

The block diagrams in the Figures illustrate the architecture, functionality, and operation of possible implementations of systems, methods, and computer-usable storage media according to various embodiments of the present invention. In this regard, each block in the block diagrams may represent a module, segment, or portion of code, which comprises one or more executable instructions for implementing the specified logical function(s). It should also be noted that, in some alternative implementations, the functions discussed in association with a block may occur in a different order than discussed. For example, two functions occurring in succession may, in fact, be implemented in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The invention claimed is:

1. A method for efficiently managing and analyzing log information, the method comprising:
   providing a community database for a particular product comprising at least one of hardware and software;
   enabling a user to view a log file associated with the particular product, the log file comprising a plurality of lines of esoteric terminology and codes that are difficult to understand for untrained users, the log file recording events taking place during execution of the particular product and providing an audit trail to understand activity of the particular product;
   enabling the user to create a category and link a portion of a line of esoteric terminology and codes of the log file to the category;
   submitting the category to a database administrator to accept or decline the category for admission into the community database; and
   in the event the database administrator accepts the category, performing the following:
      storing the category in the community database;
      linking the portion of the line of esoteric terminology and codes to the category; and
      upon opening future log files, using the category in the community database to identify lines of esoteric terminology and codes containing the portion.

2. The method of claim 1, further comprising enabling a user to select the category and filter lines of esoteric terminology and codes in a log file in accordance with the category.

3. The method of claim 1, wherein submitting the category to the database administrator further comprises checking for duplicates of the category in the community database.

4. The method of claim 3, in the event a duplicate of the category is located in the community database, declining to admit the category into the community database.

5. The method of claim 3, in the event a duplicate of the category is located in the community database, linking the portion of the line of esoteric terminology and codes to the duplicate and declining to admit the category into the community database.

6. The method of claim 1, further comprising enabling a plurality of users to access and update categories in the community database.

7. The method of claim 1, wherein identifying the lines of esoteric terminology and codes comprises labeling the lines of esoteric terminology and codes.

8. A computer program product for efficiently managing and analyzing log information, the computer program product comprising a non-transitory computer-readable storage medium having computer-usable program code embodied therein, the computer-usable program code comprising:
   computer-usable program code to provide a community database for a particular product comprising at least one of hardware and software;
   computer-usable program code to enable a user to view a log file associated with the particular product, the log file comprising a plurality of lines of esoteric terminology and codes that are difficult to understand for untrained users, the log file recording events taking place during execution of the particular product and providing an audit trail to understand activity of the particular product;
   computer-usable program code to enable the user to create a category and link a portion of a line of esoteric terminology and codes of the log file to the category;
   computer-usable program code to submit the category to a database administrator to accept or decline the category for admission into the community database; and
   computer-usable program code to, in the event the database administrator accepts the category, perform the following:
      store the category in the community database;
      link the portion of the line of esoteric terminology and codes to the category; and
      upon opening future log files, use the category in the community database to identify lines of esoteric terminology and codes containing the portion.

9. The computer program product of claim 8, further comprising computer-usable program code to enable a user to select the category and filter lines of esoteric terminology and codes in a log file in accordance with the category.

10. The computer program product of claim 8, wherein submitting the category to the database administrator further comprises checking for duplicates of the category in the community database.

11. The computer program product of claim 10, further comprising computer-usable program code to, in the event a duplicate of the category is located in the community database, decline to admit the category into the community database.

12. The computer program product of claim 10, further comprising computer-usable program code to, in the event a duplicate of the category is located in the community database, link the portion of the line of esoteric terminology and codes to the duplicate and decline to admit the category into the community database.

13. The computer program product of claim 8, further comprising computer-usable program code to enable a plurality of users to access and update categories in the community database.

14. The computer program product of claim 8, wherein identifying the lines of esoteric terminology and codes comprises labeling the lines of esoteric terminology and codes.

15. An apparatus for efficiently managing and analyzing log information, the apparatus comprising:
   at least one processor;
   at least one memory device coupled to the at least one processor and storing computer instructions to cause the at least one processor to:
      provide a community database for a particular product comprising at least one of hardware and software;
      enable a user to view a log file associated with the particular product, the log file comprising a plurality of lines of esoteric terminology and codes that are difficult to understand for untrained users, the log file recording events taking place during execution of the particular product and providing an audit trail to understand activity of the particular product;
      enable the user to create a category and link a portion of a line of esoteric terminology and codes of the log file to the category;
      submit the category to a database administrator to accept or decline the category for admission into the community database; and
      in the event the database administrator accepts the category, perform the following:
         store the category in the community database;
         link the portion of the line of esoteric terminology and codes to the category; and
         upon opening future log files, use the category in the community database to identify lines of esoteric terminology and codes containing the portion.

16. The apparatus of claim 15, wherein the computer instructions further cause the at least one processor to enable a user to select the category and filter lines of esoteric terminology and codes in a log file in accordance with the category.

17. The apparatus of claim 15, wherein submitting the category to the database administrator further comprises checking for duplicates of the category in the community database.

18. The apparatus of claim 17, wherein the computer instructions further cause the at least one processor to, in the event a duplicate of the category is located in the community database, decline to admit the category into the community database.

19. The apparatus of claim 17, wherein the computer instructions further cause the at least one processor to, in the event a duplicate of the category is located in the community database, link the portion of the line of esoteric terminology and codes to the duplicate and decline to admit the category into the community database.

20. The apparatus of claim 15, wherein identifying the lines of esoteric terminology and codes comprises labeling the lines of esoteric terminology and codes.

* * * * *